US011967807B2

(12) United States Patent
Blickenstorfer et al.

(10) Patent No.: US 11,967,807 B2
(45) Date of Patent: Apr. 23, 2024

(54) APPARATUS FOR CUTTING, CENTERING OR RETAINING A CABLE IN A STRIPPING HEAD, AND CABLE-STRIPPING DEVICE

(71) Applicant: Schleuniger AG, Thun (CH)

(72) Inventors: Willi Blickenstorfer, Stallikon (CH); Raphael Deschler, Oberhofen (CH)

(73) Assignee: SCHLEUNIGER AG, Thun (CH)

( * ) Notice: Subject to any disclaimer, the term of this patent is extended or adjusted under 35 U.S.C. 154(b) by 455 days.

(21) Appl. No.: 17/312,202

(22) PCT Filed: Dec. 14, 2018

(86) PCT No.: PCT/EP2018/084903
§ 371 (c)(1),
(2) Date: Jun. 9, 2021

(87) PCT Pub. No.: WO2020/119916
PCT Pub. Date: Jun. 18, 2020

(65) Prior Publication Data
US 2022/0052514 A1 Feb. 17, 2022

(51) Int. Cl.
*H02G 1/12* (2006.01)
(52) U.S. Cl.
CPC .................. *H02G 1/1265* (2013.01)
(58) Field of Classification Search
CPC ....... H02G 1/1265; H02G 1/127; G02B 6/245
See application file for complete search history.

(56) References Cited

U.S. PATENT DOCUMENTS 4,745,828 A * 5/1988 Stepan .................. G02B 6/245
81/9.42
4,920,830 A * 5/1990 Stepan .................. G02B 6/566
81/9.42
(Continued)

FOREIGN PATENT DOCUMENTS

DE 202008017576 U1 2/2010
EP 0297484 B1 8/1992
(Continued)

OTHER PUBLICATIONS

International Search Report issued in corresponding PCT patent application No. PCT/EP2018/084903, 6 pages.

*Primary Examiner* — David B. Thomas
(74) *Attorney, Agent, or Firm* — Pearne & Gordon LLP

(57) ABSTRACT

The present invention relates to an apparatus (100, 200, 300) for cutting, centering or holding a cable in a stripping head, comprising a first toothed belt wheel (1) and a second toothed belt wheel (2), which are rotatable coaxially and synchronously, but however in an angularly adjustable way with respect to one another, about a rotational axis (X), as well as a tool flange (21) coaxially connected to the first toothed belt wheel (1), in which a central opening (A) is disposed, through which the cable is able to be led or passed, the tool flange 21 comprising one or more movably attached tools (23), whereby the tools (23) are movable in relation to the rotational axis (X) by means of the positioning means (18) connected to the second toothed belt wheel (2), characterized in that the radial distance of the tools (23) to the rotational axis (X) is adjustable through an angular rotation between the first toothed belt wheel (1) and the second toothed belt wheel (2), which are driven by a common drive (Continued)

means (13). Moreover the present invention also relates to a cable-stripping device comprising an apparatus according to the invention.

20 Claims, 8 Drawing Sheets

(56) References Cited

U.S. PATENT DOCUMENTS

| | | | | |
|---|---|---|---|---|
| 4,981,054 A | * | 1/1991 | Stepan | G02B 6/245 81/9.42 |
| 5,010,797 A | * | 4/1991 | Stepan | H02G 1/1265 83/885 |
| 5,111,720 A | * | 5/1992 | Stepan | G02B 6/566 81/9.42 |
| 5,243,882 A | * | 9/1993 | Stepan | H02G 1/1265 81/9.42 |
| 5,596,802 A | | 1/1997 | Koch et al. | |
| 5,781,984 A | * | 7/1998 | Koch | H02G 1/1265 81/9.51 |
| 6,360,430 B1 | * | 3/2002 | Stepan | H02G 1/1265 29/33 F |
| 6,910,256 B2 | * | 6/2005 | Locher | H01R 43/28 81/9.51 |
| 7,597,030 B2 | * | 10/2009 | Stepan | G02B 6/566 81/9.42 |
| 10,819,093 B2 | * | 10/2020 | Appenzeller | H02G 1/127 |
| 10,840,680 B2 | * | 11/2020 | Houser | H02G 1/1265 |
| 11,018,483 B2 | * | 5/2021 | Houser | H02G 1/1265 |
| 11,056,852 B2 | * | 7/2021 | Houser | H02G 1/127 |
| 2017/0032872 A1 | | 2/2017 | Lenz et al. | |
| 2020/0067289 A1 | * | 2/2020 | Houser | H02G 1/1265 |
| 2020/0076148 A1 | * | 3/2020 | Houser | H02G 1/1297 |
| 2020/0076173 A1 | * | 3/2020 | Houser | H01R 43/28 |

FOREIGN PATENT DOCUMENTS

| | | |
|---|---|---|
| EP | 0673099 B1 | 9/1995 |
| EP | 3125382 B1 | 2/2017 |
| WO | 1998013907 A1 | 4/1998 |
| WO | 2005046015 A1 | 5/2005 |
| WO | 2018060880 A1 | 4/2018 |

* cited by examiner

APPARATUS FOR CUTTING, CENTERING OR RETAINING A CABLE IN A STRIPPING HEAD, AND CABLE-STRIPPING DEVICE

TECHNICAL FIELD

The present invention relates to an apparatus for stripping heads, in particular to an apparatus for cutting, centering or holding a cable in a stripping head. The invention especially relates to an apparatus for a rotary cutting stripping head, which is required primarily for stripping of coaxial cables, but also for other cables and wires. Blades thereby rotate around the cable and are advanced radially to the desired cutting depth. Moreover the present invention also relates to an apparatus with which a cable can be centered or held in a stripping head by means of centering jaws. Furthermore the present invention also relates to a cable-stripping device which comprises an apparatus according to the invention.

STATE OF THE ART

With a coaxial cable, the stripping is carried out in stages. Usually the first cut severs the outer protective sheath and the screen or shield, whereupon the severed layers are immediately removed. Afterwards the dielectric is incised as far as the inner conductor and partially or entirely removed. Afterwards the protective sheath is incised as far as the screen or shield and partially or entirely removed. A partial removal protects the screen or shield or the inner conductor against fraying or unravelling until further processing of the cable.

Known from EP0297484B1 is an arrangement of at least three holding, centering or knife jaws, lying in a plane, for stripping apparatuses, in which the centering jaws or blades are displaceable or pivotable under positive control in such a way that a different contact point of each knife blade or respectively a different contact line of each centering surface is assigned to each cable diameter, whereby the stability of the cutting edges and centering jaws is increased. The displacement of the centering and knife jaws takes place either through levers and cones or through a disc with control grooves, in which guide pins of the blades or centering jaws engage.

Known from WO2005046015A1 is a coaxial design of the arrangement known from EP0297484B1 of centering jaws and blade holders. A belt pulley is firmly connected to a spiral flange, which in addition, by means of ball bearings, bears coaxially a head body. The belt pulley and the head body are driven by means of toothed belt independently of one another, that means by two separate motors and if necessary in a differentiated way. Through a relative movement of the belt pulley with respect to the head body, a closing or opening of the blades is brought about.

A knife or centering jaws adjustment through a differentiated drive with the aid of two synchronously driven motors is costly in terms of control technology and involved, whereby, depending upon the load torque and rotational speed, a small lag error always sets in, which results in an undesired displacement of the knife and/or centering jaws opening.

Step motors would be very suitable for a differentiated drive. These have however the drawback that with increasing rotational speed the permissible drive torque decreases, so that the rotational speed during cutting must be limited in order to keep the risk of lag errors and step losses within limits. During blade drive, step losses would bring about discrete errors of cutting depth until the next referencing. Likewise, during centering jaws drive, step losses would bring about discrete errors in the guide diameter. For these reasons the idea of two synchronously driven motors has never been implemented on a large scale to this day.

The object of the present invention is to overcome the previously described disadvantages of the differentiated drive with the aid of two synchronously driven motors and to propose an apparatus for cutting, centering or holding a cable in which the one motor is required only for the advance of the tools, while the proven mechanical adjustment of the knife- and centering jaws by means of spiral flange or pivoting movements of the knife- or centering jaws should be kept.

SUMMARY OF INVENTION

These objects are achieved according to the present invention above all through the elements of the two independent claims. Further advantageous embodiments follow moreover from the dependent claims and the description.

In particular the objects of the present invention are achieved through an apparatus for cutting, centering or holding a cable in a stripping head, comprising a first toothed belt wheel and a second toothed belt wheel, which are rotatable coaxially and synchronously, but however in an angularly adjustable way with respect to one another, about a rotational axis, as well as a tool flange coaxially connected to the first toothed belt wheel, in which tool flange a central opening is disposed, through which the cable is able to be led or passed, whereby the tool flange comprises one or more movably attached tools, whereby the tools are movable in relation to the common rotational axis of the first toothed belt wheel and of the second toothed belt wheel by means of the positioning means connected to the second toothed belt wheel, whereby the radial distance of the tools to the common rotational axis of the first toothed belt wheel and of the second toothed belt wheel is adjustable through an angular rotation between the first toothed belt wheel and the second toothed belt wheel, which are driven by a common drive means.

With such an apparatus it is possible to set precisely the radial distance of the tools, which cut, center or hold a cable, in relation to the rotational axis of the apparatus with just an angular rotation between the first toothed belt wheel and the second toothed belt wheel. Furthermore the apparatus needs only one drive means for the synchronous drive of the first toothed belt wheel and the second toothed belt wheel. Thus, in contrast to known apparatuses, there is no risk that the toothed belt wheels over time no longer rotate synchronously, which would lead to imprecise incision diameters, for example.

In a first preferred embodiment of the present invention, the apparatus comprises a third toothed belt wheel and a fourth toothed belt wheel, which are drivable by means of the drive means, whereby the first toothed belt wheel is drivable by the third toothed belt wheel via a first toothed belt and the second toothed wheel by the fourth toothed belt wheel via a second toothed belt. It is thereby simple to have the first toothed belt wheel and the second toothed belt wheel rotate synchronously. It is also possible to construct the apparatus in a very compact and space-saving way. Furthermore it is thereby possible to arrange the third toothed belt wheel and the fourth toothed belt wheel either coaxially or non-coaxially. The exact construction design of the apparatus according to the invention can thus be selected in a very flexible way.

In a further preferred embodiment of the present invention, the apparatus comprises at least one deflection roller and one tensioning roller, which deflect, preferably waist, the second toothed belt, whereby the angular rotation between the first toothed belt wheel and the second toothed belt wheel is achievable through a position change of the deflection roller and/or the tensioning roller. It is thereby possible, with only a position change of the deflection roller and/or the tensioning roller, for example a purely translational movement, to produce the angular rotation between the first toothed belt wheel and the second toothed belt wheel and thus to change the position of the tools in relation to the rotational axis of the apparatus. The apparatus can thereby be constructed very compactly.

In a further preferred embodiment of the present invention, the third toothed belt wheel and the fourth toothed belt wheel are united. This presents an even simpler construction design of the apparatus.

In another preferred embodiment of the present invention, the apparatus comprises a deflection belt kept under tension, which connects the third toothed belt wheel and the fourth toothed belt wheel, and moreover a first movable deflection roller, which is disposed along the deflection belt between the third toothed belt wheel and the fourth toothed belt wheel and deflects the deflection belt, whereby the angular rotation between the first toothed belt wheel and the second toothed belt wheel is achievable through a position change of the first movable deflection roller. It is thereby possible with only a position change of the first movable deflection roller, for example with a purely translational movement, to produce the angular rotation between the first toothed belt wheel and the second toothed belt wheel and thus to change the position of the tools in relation to the rotational axis of the apparatus. Thanks to the position of the first movable deflection roller between the third toothed belt wheel and the fourth toothed belt wheel, the tension of the first toothed belt or of the second toothed belt is not dependent upon the position of the deflection roller. The advance of the tools can thereby take place more precisely and the angular rotation between the first toothed belt wheel and the second toothed belt wheel can be designed bigger.

In another preferred embodiment of the present invention, the center of the first movable deflection roller is always disposed on the perpendicular bisector between the center of the third toothed belt wheel and the center of the fourth toothed belt wheel, and the diameter of the first movable deflection roller corresponds to the peripheral distance between the third toothed belt wheel and the fourth toothed belt wheel. With such a configuration, the section of the deflection belt between the third toothed belt wheel and the first movable deflection roller runs parallel to the section of the deflection belt between the first movable deflection roller and the fourth toothed belt wheel. A linear relationship thus results between the amount of position change of the first movable deflection roller and the angular rotation between the first toothed belt wheel and the second toothed belt wheel.

In another preferred embodiment of the present invention, the apparatus comprises at least one first non-movable deflection roller and one second non-movable deflection roller, as well as a second movable deflection roller, which is installed with the first movable deflection roller on a carriage, whereby the second movable deflection roller is disposed along the deflection belt between the first non-movable deflection roller and the second non-movable deflection roller and deflects the deflection belt and whereby the angular rotation between the first toothed belt wheel and the second toothed belt wheel is achievable through a translational movement of the carriage.

With such a mechanism it is possible, with a purely translational movement of the carriage, to bring about the angular rotation between the first toothed belt wheel and the second toothed belt wheel and thereby to change the position of the tools in relation to the rotational axis of the apparatus. This mechanism has furthermore the advantage that the deflection belt is always kept under the same tension irrespective of the position of the first movable deflection roller. This makes possible a precise advance of the tools and prevents the deflection belt from being damaged owing to too high a tension.

In a further preferred embodiment of the present invention, the apparatus comprises a second motor, with which the position change of the deflection roller is drivable, whereby the angular rotation between the first toothed belt wheel and the second toothed belt wheel is achievable. The position change can thereby take place quickly, precisely and in a reproducible way. If the second motor is controlled by computer, this can take place automatically and at high speed.

In another preferred embodiment of the present invention, the apparatus comprises a planetary gearing with annulus gear, planetary wheels and sun wheel, whereby the circling of the planetary wheels about the sun wheel is drivable through the rotation of the fourth toothed belt wheel, whereby through the circling of the planetary wheels about the sun wheel a shaft is drivable, which is connected to the third toothed belt wheel, whereby the sun wheel is installed in a way rotatable about a common rotational axis of the third toothed belt wheel and of the fourth toothed belt wheel and whereby the angular rotation between the first toothed belt wheel and the second toothed beltwheel is achievable through a rotation of the sun wheel.

With this mechanism, the angular rotation between the first toothed belt wheel and the second toothed belt wheel and accordingly the setting of the position of the tools can be brought about by a turning movement. A turning of the sun wheel can thereby be "translated" into an angular rotation between the first toothed belt wheel and the second toothed belt wheel, superimposed on the common rotation of the first toothed belt wheel and of the second toothed belt wheel. This translation of the angular rotation is independent of the rotational speed of the first toothed belt wheel and of the second toothed belt wheel. It makes possible an especially simple and precise advance of the blades.

In a further preferred embodiment of the present invention, the apparatus comprises a second motor, with which the rotation of the sun wheel is drivable, through which the angular rotation between the first toothed belt wheel and the second toothed belt wheel is facilitated. With the second motor, the position change can be carried out in a reproducible, quick and precise way. If the motor is controlled by a computer, this can take place in a fully automated way.

In another preferred embodiment of the present invention, the apparatus comprises a third toothed belt wheel and a fifth toothed belt wheel, which are drivable by means of the drive means, the first toothed belt wheel being drivable by the third toothed belt wheel via a first toothed belt and the second toothed belt wheel being drivable by the fifth toothed belt wheel via a second toothed belt, and moreover a planetary gearing with planetary wheels, and a sun wheel connected and drivable with the fifth toothed belt wheel, whereby the planetary gearing is disposed inside a hollow body with inner toothing, whereby through the circling of the planetary wheels around the sun wheel a shaft is drivable which is connected to the planetary wheels and to the third toothed belt wheel, and whereby the angular rotation between the first toothed belt wheel and the second toothed belt wheel is achievable through a rotation of the hollow body.

With this embodiment the angular rotation between the first toothed belt wheel and the second toothed belt wheel and accordingly the setting of the position of the tools can be brought about by a turning movement of the hollow body. It makes possible an especially simple and precise advance of the blades.

In another preferred embodiment of the present invention, the tools are disposed evenly on the tool flange. This ensures a precise cutting, centering or holding of a cable.

In a further preferred embodiment of the present invention, the tools are installed on the tool flange in a way swivel mounted about pivot pins. The tool flange can thereby be constructed compactly and the positioning means with which the tools are advanced can take the form of simple positioning pins.

In a further preferred embodiment of the present invention, the tools are installed on the tool flange in a radially displaceable way. The setting means can thereby take the form of a spiral flange.

In another preferred embodiment of the present invention, the angular rotation between the first toothed belt wheel and the second toothed belt wheel is controllable with electronic means. The advance of the blades can thereby take place in a completely automated way.

In another preferred embodiment of the present invention, the tools are blades. A cable can thereby be processed quickly and precisely, e.g. can be stripped.

In another preferred embodiment of the present invention, the apparatus comprises detection means, with which a contact between blades and the electrical conductor of the cable to be processed is detectable. It can thereby be detected whether the blades touch the electrical conductor of the cable. Thus it can be ensured that the blades do not "injure" the electrical conductor. With such contact detection, the incision depth for subsequent processing can be continuously adapted with statistical methods in an optional way, or the cutting regime intervenes quickly enough, based on contact detection, in the current incision step before damage to the conductor arises.

The contact detection can also be used to determine the optimal production incision and removal diameter before production, using test incisions until blade-conductor contact, with statistical methods.

Moreover the detection means can be used for control of the incision position or removal length, in that with initially closed blades the cable is brought by hand or automatically up to contact with the blades, whereupon the cable holder closes, the blades open and the cable holder brings the cable into processing position.

In another preferred embodiment of the present invention, the tools are centering jaws. A cable can thereby be precisely centered and/or held.

In another preferred embodiment of the present invention, the shape of the sheathing of a cable is able to be changed using the tools. The sheathing of a cable can thereby be pressed around with tools that are standing still, or widened through kneading, or the sheathing can be reshaped by means of tools rubbing on it or rotating tools rolling off of it.

The objects of the present invention are moreover also achieved through a cable-stripping device comprising an apparatus according to the invention.

PREFERRED EMBODIMENTS OF THE INVENTION

Figure 1:
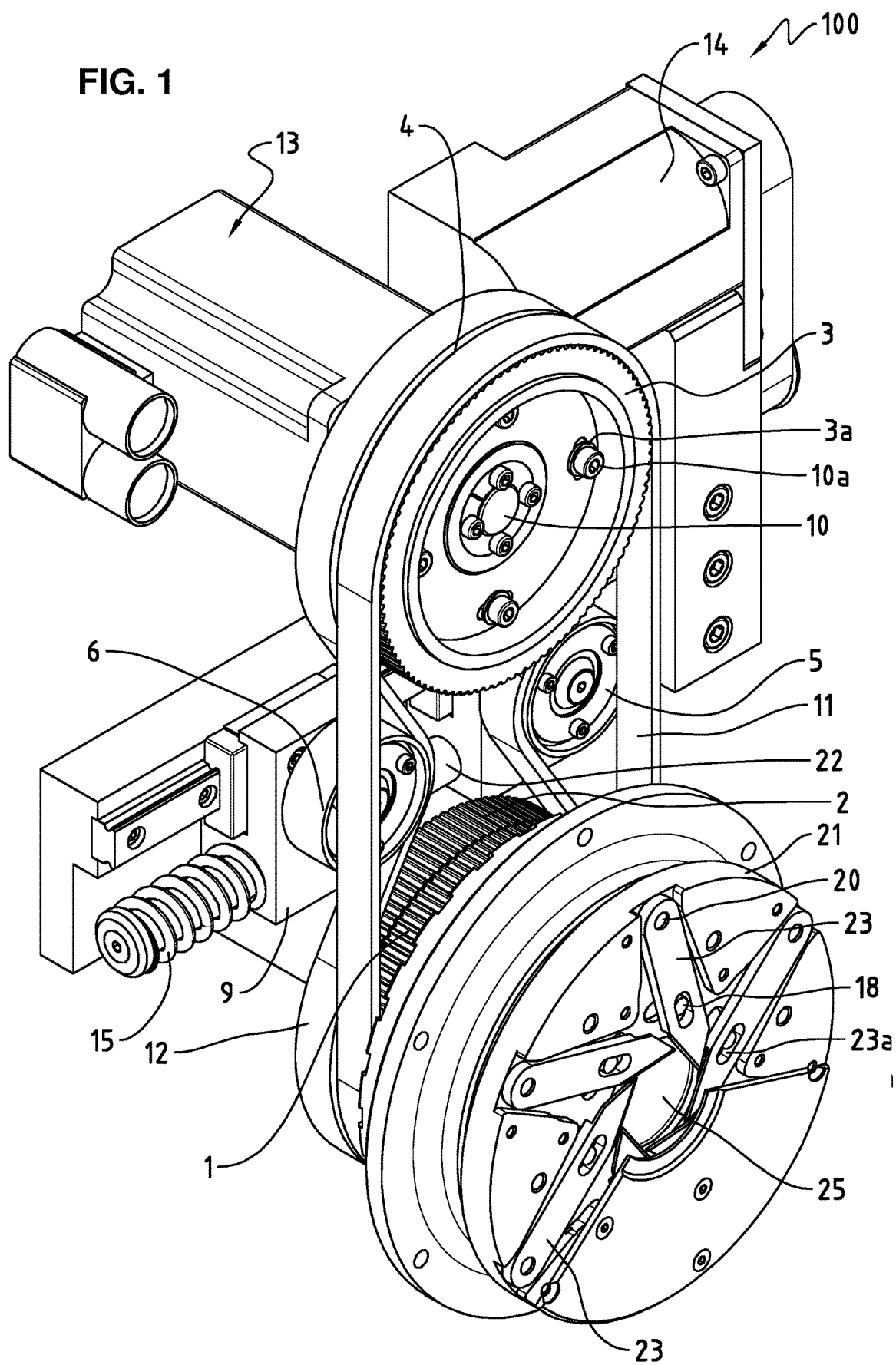
FIG. 1 shows a perspective view of a first embodiment of an apparatus according to the invention.
Figure 2:
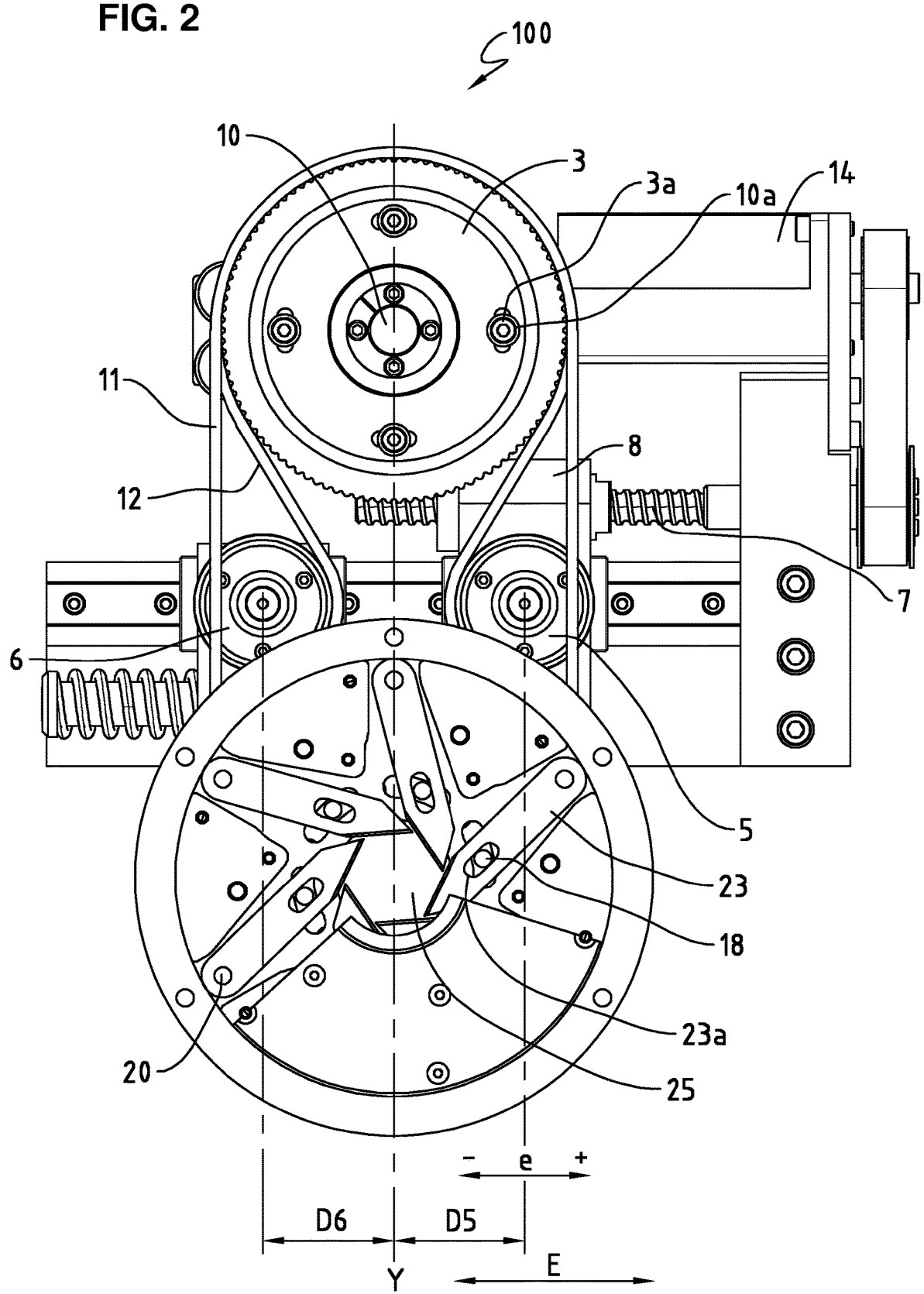
FIG. 2 shows a front view of a first embodiment of an apparatus according to the invention.

FIG. 1 shows a perspective view and FIG. 2 a front view of a first embodiment of an apparatus 100 according to the invention. In this embodiment, a third toothed belt wheel 3 and a fourth toothed belt wheel 4 are driven with the same drive shaft 10 by a common drive means, here by a first motor 13. Toothed belt wheels 3 and 4 are screwed by means of screws 10a and therefore turn synchronously. Toothed belt wheel 3 has slotted holes 3a, which can be used for a relative angular rotation of the toothed belt wheels 3 and 4 to adjust the knife opening.

The third toothed belt wheel 3 drives via a first toothed belt 11 a first toothed belt wheel 1, and the fourth toothed belt wheel 4 drives via a second toothed belt 12 a second toothed belt wheel 2. The first toothed belt wheel 1 and the second toothed belt wheel 2 thus turn coaxially and synchronously. The first toothed belt wheel 1 and the second toothed belt wheel 2 are however rotatably mounted in an angularly adjustable way with respect to one another. The first toothed belt wheel 1 and the second toothed belt wheel 2 define an opening A, through which a cable can be led or passed or cable processing waste can be suctioned off.

Figure 3:
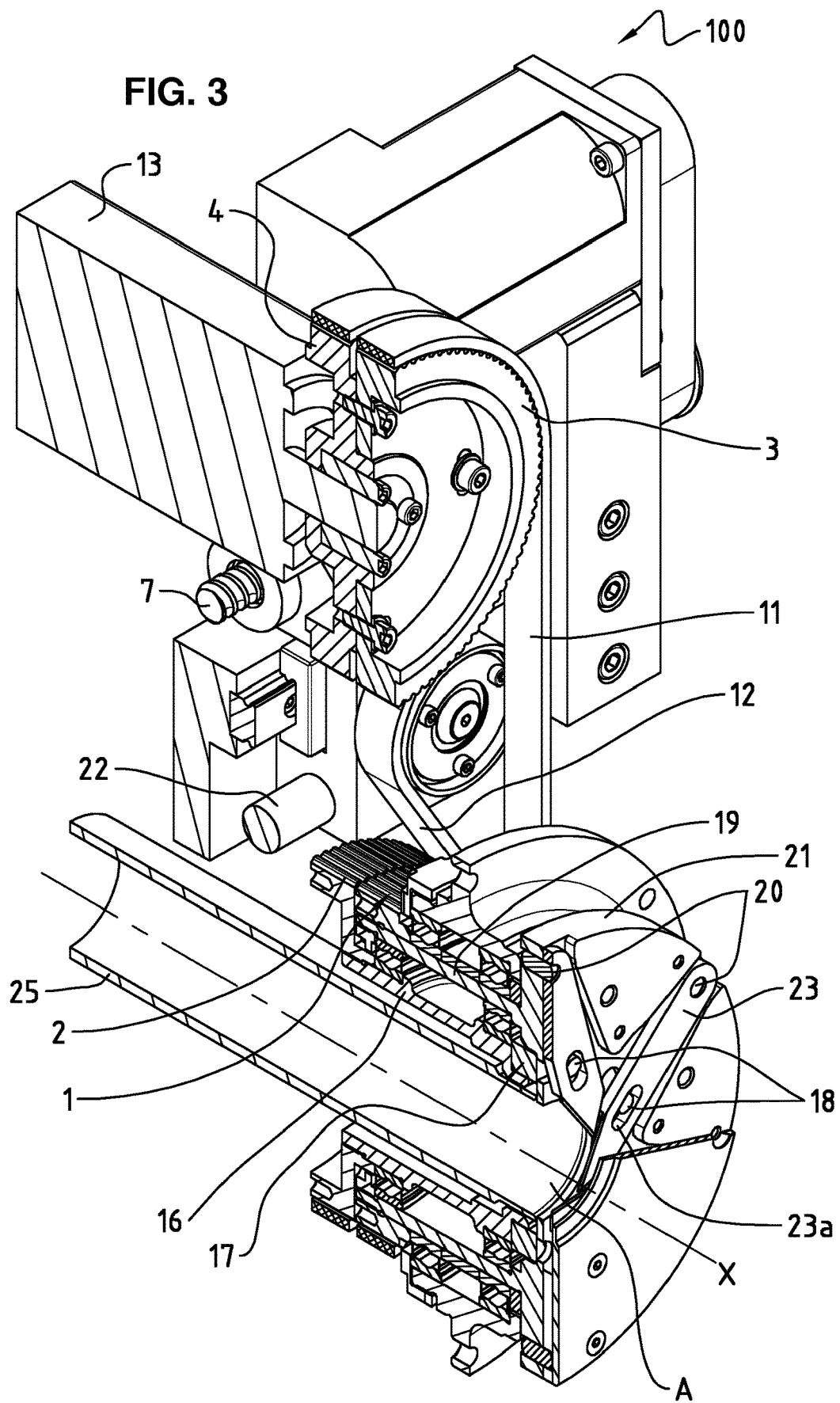
FIG. 3 shows a perspective sectional view of a first embodiment of an apparatus according to the invention.

With reference to FIG. 3, it can be seen that the second toothed belt wheel 2 is connected to positioning pins 18 via a bearing sleeve 16 and via an adjusting ring 17. The first toothed belt wheel 1 is connected via a rotor 19 to the pivot pins 20. Connected to the rotor 19 is also a tool flange 21, here a knife flange, on which tools 23 are installed, here they are blades, in a way pivotable about the pivot pins 20. The positioning pins 18 are disposed in such a way that they engage in the blade openings 23a and thus allow the blades 23 to pivot about the pivot pins 20. Via the angular rotation between the first toothed belt wheel 1 and the second toothed belt wheel 2 a desired knife-pivot-angle $\lambda$ and cutting diameter Df can thus be set.

As is seen in FIGS. 1 to 3, the second toothed belt 12 is waisted by a deflection roller 5 and a tensioning roller 6. In this embodiment, the deflection roller 5 can be shifted by a second motor 14 via spindle 7 and via a first carriage 8 in a translational way. A second carriage 9 is connected to the first carriage 8 via spring bolts 22 and spring 15.

As shown in FIG. 2, the symmetry position of the apparatus 100 is defined as the position in which the distance D5 of the deflection roller 5 to the axis of symmetry Y is the same as the distance D6 of the tensioning roller 6 to the axis of symmetry Y. Through loosening of the screws 10a and turning of the fourth toothed belt wheel 4 relative to the third toothed belt wheel 3, a turning of the first toothed belt wheel 1 relative to the second toothed belt wheel 2 can be brought about without a displacement of the deflection roller 5 being necessary. The positioning pins 18 thereby rotate about the rotational axis X and pivot the blades 23. The position of the blades 23 can thereby be set in the symmetry position in a simple way.

Figure 4A:
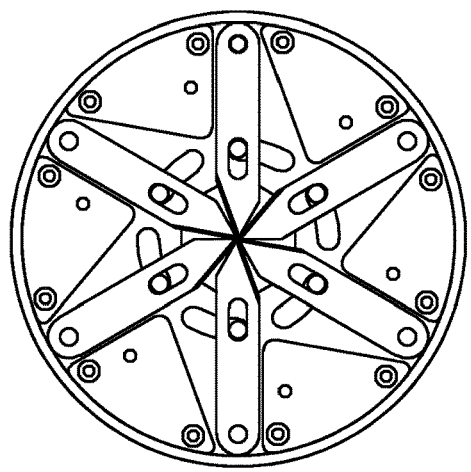
FIG. 4a shows the knife flange with the blades in completely closed position.

FIG. 4a shows the blades in the position with the smallest cutting diameter Df.

Figure 4B:
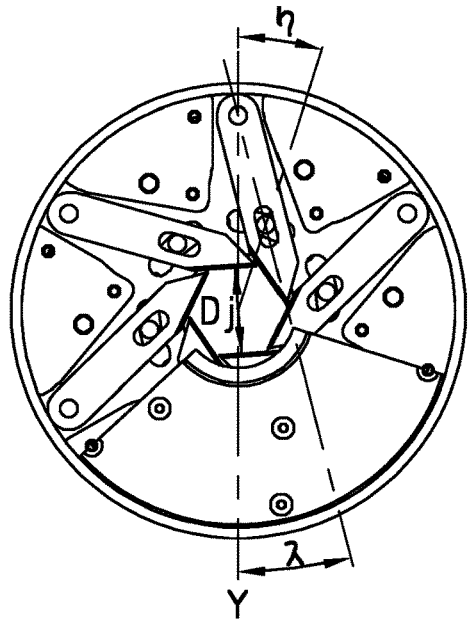
FIG. 4b shows the knife flange with the blades in a middle position.

FIG. 4b shows the blades in adjustment position, which is achieved in that, in the symmetry position, through loosening of the screws 10a and turning of the fourth toothed belt wheel 4 relative to the third toothed belt wheel 3, the turning of the second toothed belt wheel 2 relative to the first toothed belt wheel 1 is brought about and thus the closing of the blades to an adjustment-cutting-diameter Dj. In this position, the positioning pins 18 are turned with respect to the axis of symmetry Y by a so-called adjusting ring-adjustment-angle η, which subsequently serves as the basis for the geometric relationship of cutting diameter Df and deflection roller displacement e.

Figure 4C:
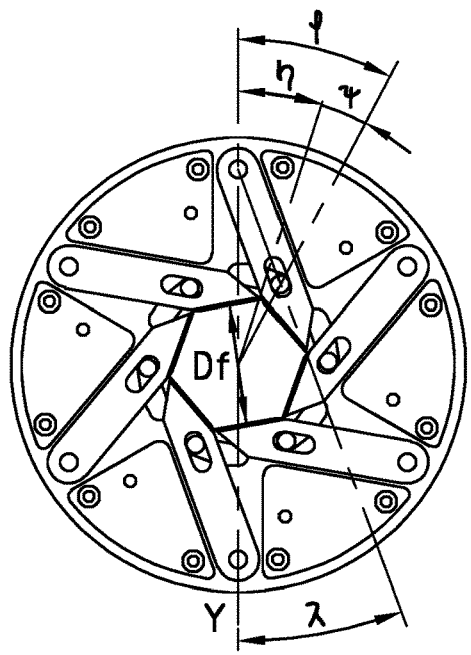
FIG. 4c shows the knife flange with the blades in completely open position.

If now, in accordance with FIG. 2, the first carriage 8 with the deflection roller 5 is shifted from the symmetry position to the right and along direction E, the second carriage 9 with the tensioning roller 6 is also shifted to the right via the spring bolts 22 and spring 15, so that the tensioning roller 6 is pressed on the second toothed belt 12. The horizontal displacement e of the deflection roller 5 to the right in relation to the symmetry position brings about a turning of the second toothed belt wheel 2 relative to the first toothed belt wheel 1. Since the adjusting ring and the positioning pins 18 are connected to the second toothed belt wheel 2, the positioning pins 18 are turned by a so-called adjusting ring-twist-angle ψ with respect to the tool flange and the pivot pins. As shown in FIG. 4c, this adjusting ring-twist-angle ψ added to the adjusting ring-adjustment-angle η adds up to the adjusting ring-total-angle φ. The blades 23 are pivoted by the positioning pins 18 and from this adjusting ring-total-angle φ there results a cutting diameter Df. It is important to note that the adjusting ring-twist-angle ψ is independent from the rotational speed of the toothed belt wheels 1, 2 and that the toothed belt wheels 1 and 2 again turn synchronously, as soon as the cutting diameter Df has been set. Hence the setting of the adjusting ring-twist-angle ψ represents only a phase shift between the first toothed belt wheel 1 and the second toothed belt wheel 2 with respect to the adjusting ring-adjustment-angle η.

The exact mathematical correlation between the amount e of the horizontal shift of the deflection roller 5 and the cutting diameter Df will not be derived here. One skilled in the art would be able to derive this correlation without any difficulty through trigonometric considerations. It is only pointed out here that, for the cutting diameter Df, it is possible to derive the correlation between e and Df.

Figure 7:
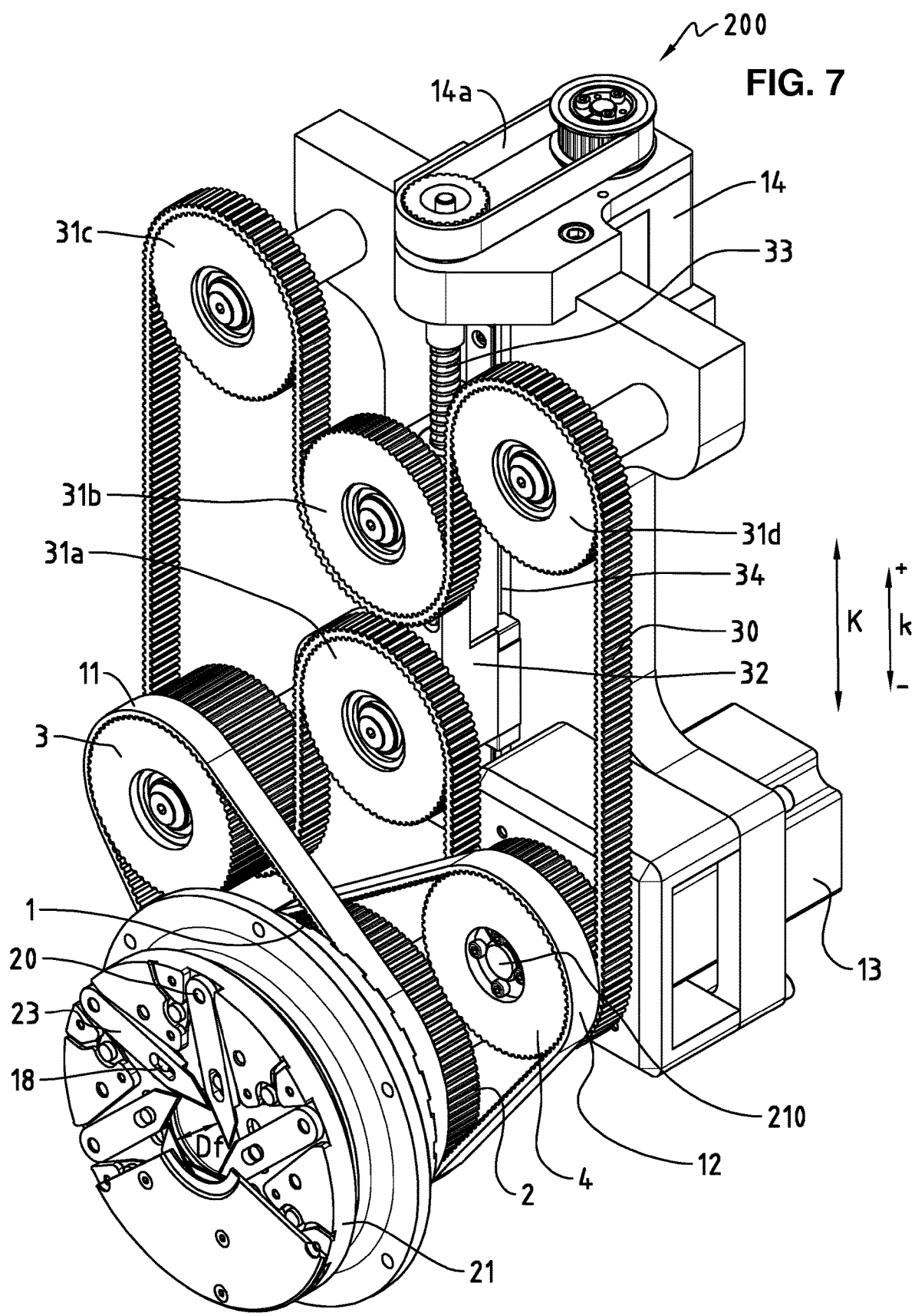
FIG. 7 shows a perspective view of a third embodiment of an apparatus according to the invention.

FIG. 7 shows a second preferred embodiment of an apparatus 200 according to the invention. Components which carry out the same function as in the first embodiment are designated here with the same reference numerals. Unlike in apparatus 100, the toothed belt wheels 3 and 4 are not coaxially arranged. They are however drivable synchronously with the deflection belt 30 by the same first motor 13, which allows the shaft 210 to rotate. As in the apparatus 100, the third toothed belt wheel 3, via a first toothed belt 11, drives a first toothed belt wheel 1, and the fourth toothed belt wheel 4 drives, via a second toothed belt 12, a second toothed belt wheel 2. The first toothed belt wheel 1 and das second toothed belt wheel 2 thus turn synchronously. The toothed belt wheels 1, 2 are however rotatably mounted in an angularly adjustable way with respect to one another in this embodiment too.

The deflection belt 30 is deflected with the non-movable deflection rollers 31c, 31d, whereby the movable deflection rollers 31a and 31b are installed on a carriage 32, which is movable in direction K by means of spindle 33 and track 34 movable. The spindle 33 is driven by the second motor 14 and motor belt 14a. Thanks to this mechanism, the distance between the axes of the movable deflection rollers 31a, 31b can be adjusted to the axes of the non-movable deflection rollers 31c, 31d and to the axes of the third and fourth toothed belt wheels 3, 4.

Figure 8:
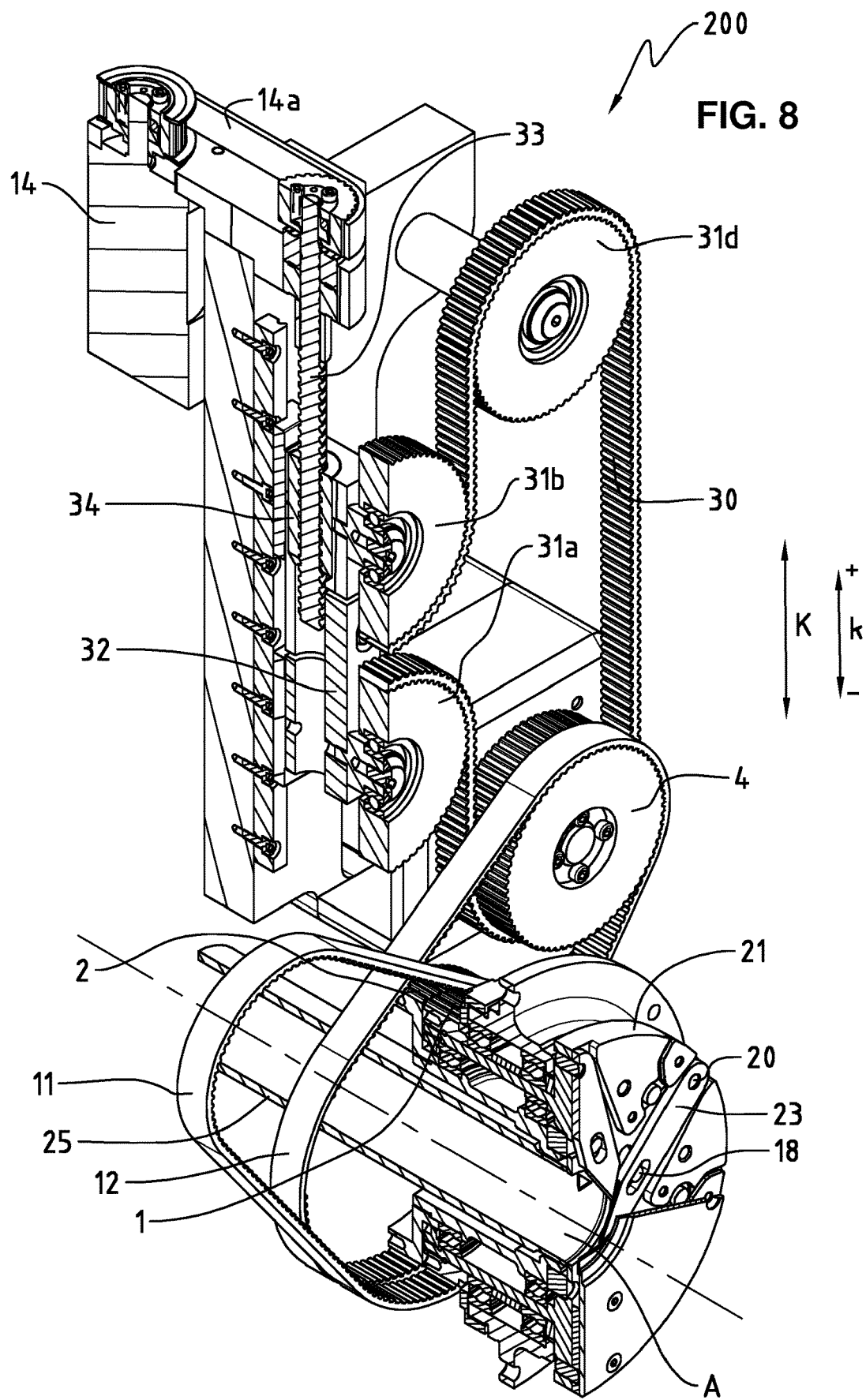
FIG. 8 shows a perspective sectional view of a third embodiment of an apparatus according to the invention.

As is easy to understand from FIG. 7, a shift k of the movable deflection rollers 31a and 31b in direction K with respect to the adjustment position brings about a turning of the first toothed belt wheel 1 relative to the second toothed belt wheel 2. Since the positioning pins 18 (exactly as can be seen in the apparatus 100 and as in FIG. 8) are connected to the second toothed belt wheel 2, the positioning pins 18 are turned in a way corresponding to the displacement k by the so-called adjusting ring-twist-angle ψ. This adjusting ring-twist-angle ψ with the adjusting ring-adjustment-angle η adds up to the adjusting ring-total-angle φ, as shown in FIG. 4c. The blades 23 are shifted by the positioning pins 18, and from this adjusting ring-total-angle ψ there results a cutting diameter Df. It is important to note that the twist angle ψ here too is independent of the rotational speed of the toothed belt wheels and that the toothed belt wheels 1 and 2 again turn synchronously, as soon as the cutting diameter Df has been set. Hence the setting of the adjusting ring-twist-angle ψ merely represents a phase shift between the toothed belt wheels 1, 2 with respect to the adjusting ring-adjustment-angle η.

Unlike in the apparatus 100, the adjusting ring-adjustment-angle η is set with the position of the carriage 32. Around this adjustment position the carriage is then shifted along the direction K, in order to set the cutting diameter Df via the adjusting ring-twist-angle ψ. A further different between apparatus 100 and apparatus 200 consists in the mathematical relationship between the displacement e of the deflection roller 5 or the shift k of the movable deflection rollers 31a, 31b and the adjusting ring-twist-angle ψ. While in the case of apparatus 100 there exists a non-linear relationship between deflection roller shift e and adjusting ring-twist-angle ψ, there results in the case of the apparatus 200 a purely linear connection between the deflection roller shift k and the adjusting ring-twist-angle ψ.

If one of the deflection rollers 31a, 31b is designed as tensioning roller, that is preferably 31b, since the deflection roller driven in a translatory way should be placed as close as possible to the third toothed belt wheel 3 and the fourth toothed belt wheel 4 in order to minimize cutting diameter errors through stretching of the deflection belt. Preferably the sections of the deflection belt 30 between third toothed belt wheel 3 and movable deflection roller 31a as well as fourth toothed belt wheel 4 and movable deflection roller 31a run parallel to one another.

The exact mathematical relationship between k and the adjusting ring-twist-angle ψ will not be derived here. One skilled in the art could derive this correlation without any difficulty through trigonometric considerations. Exactly as in the case of apparatus 100, it is possible in the case of apparatus 200 to derive the correlation between k and Df.

It is important to note that the deflection rollers 31b, 31c and 31d can be positioned differently than is shown in FIG. 7 without the functioning of the apparatus 200 being affected. But it is essential that these rollers assume the function of a length compensation mechanism. When the movable deflection roller 31a is moved, one or more of the deflection rollers 31b, 31c and 31d must be correspondingly shifted so that the tension of the deflection belt 30 is preserved. In particular it must be ensured that the movement of the movable deflection roller 31a does not lead to the deflection belt 30 being torn.

Figure 5:
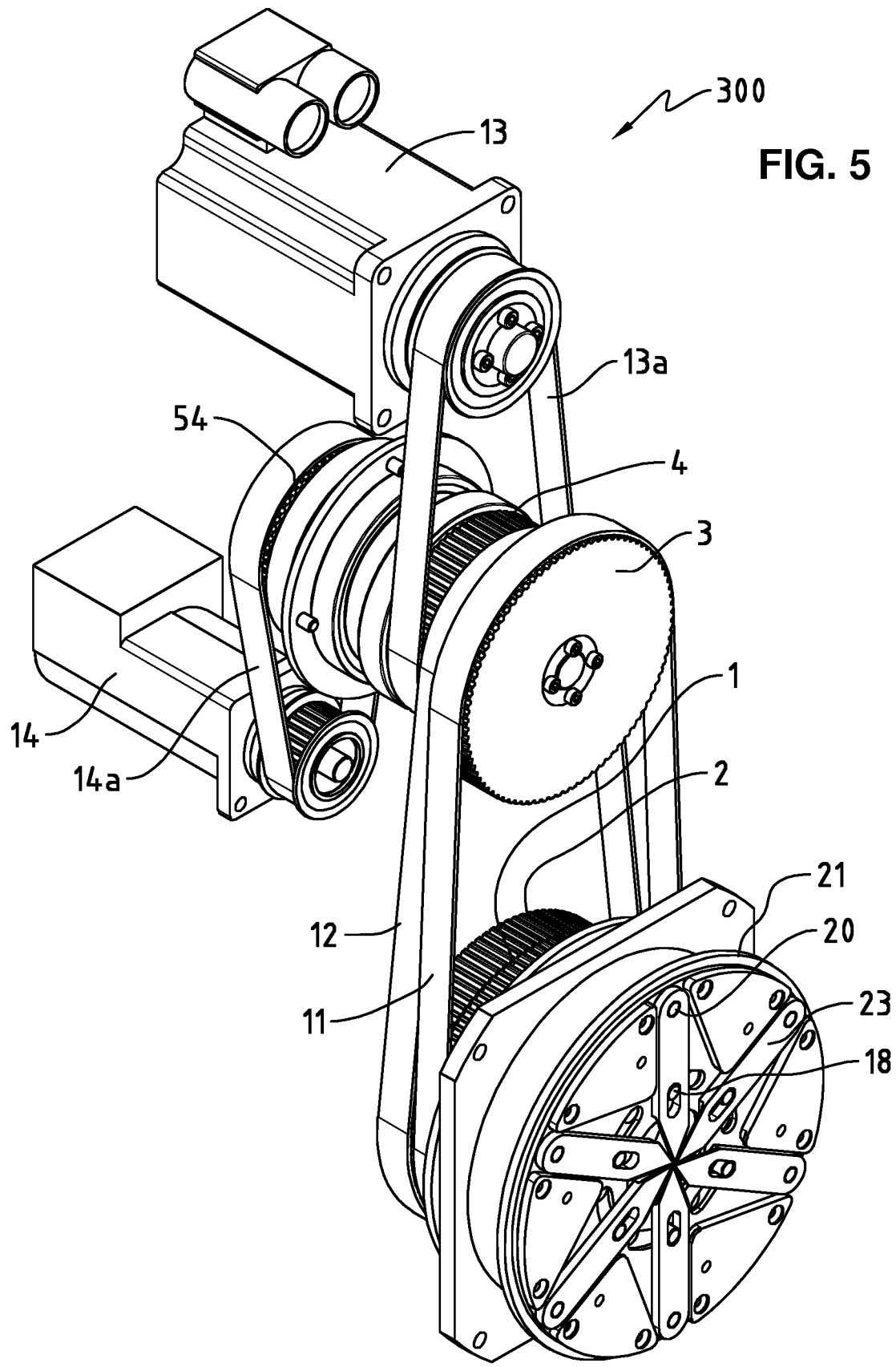
FIG. 5 shows a perspective view of a second embodiment of an apparatus according to the invention.

A third preferred embodiment of an apparatus 300 according to the invention is shown in FIG. 5. In this embodiment, the angular rotation of the otherwise synchronously turning toothed belt wheels 1 and 2, and thereby the positions of the positioning pins 18 with respect to the pivot pins 20 and thus the cutting diameter Df is achieved with a planetary gearing 50. The mechanism for pivoting of the blades with positioning pins 18 is identical in this embodiment to that of the first and second embodiments. As can be seen in FIG. 5, a first motor 13 with a first motor drive belt 13a drives the fourth toothed belt wheel 4. The fourth toothed belt wheel 4 drives, for its part, the second toothed belt wheel 2, by means of the second toothed belt 12. The third toothed belt wheel 3 drives the first toothed belt wheel 1 by means of the first toothed belt 11.

Figure 6:
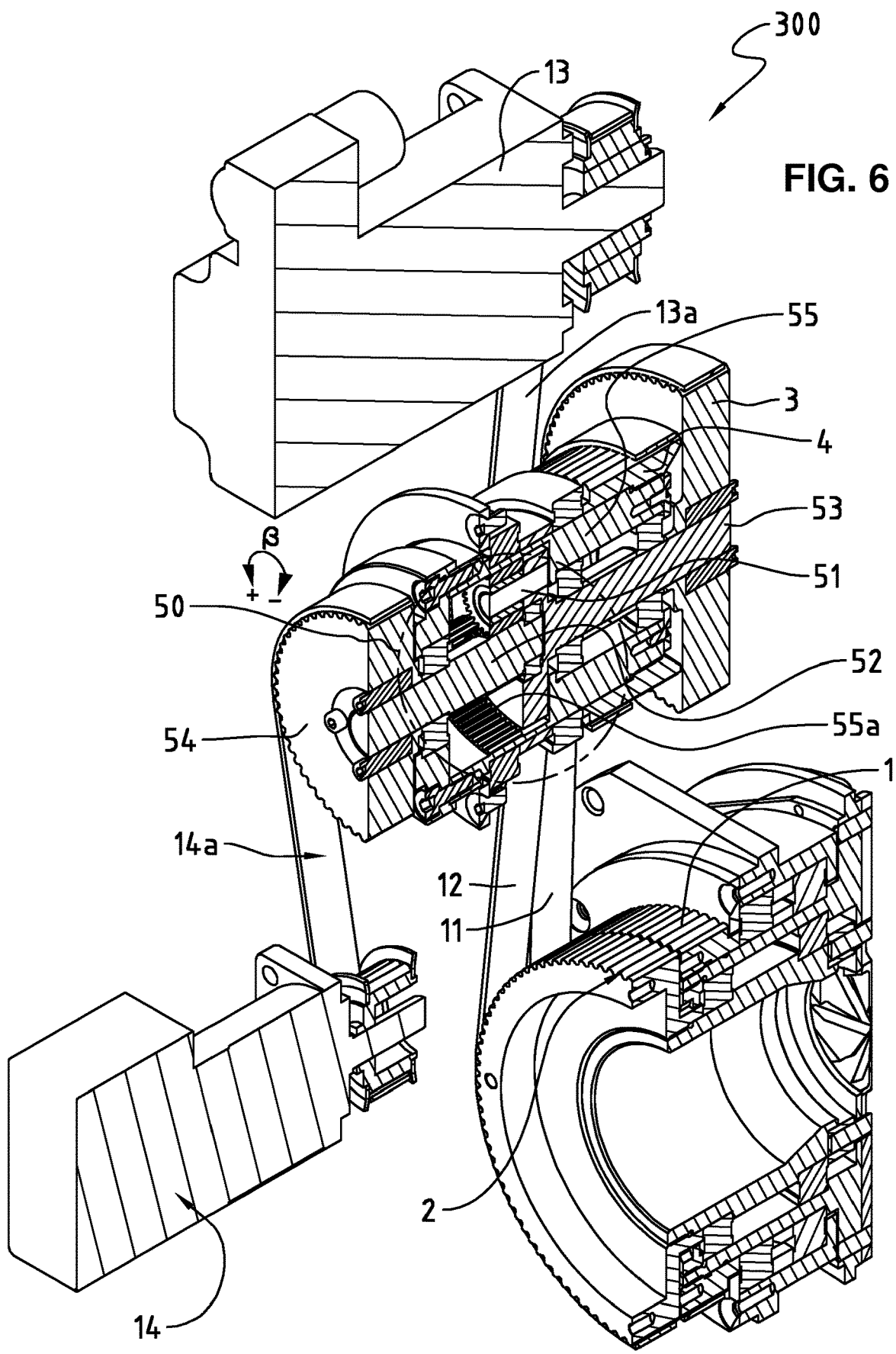
FIG. 6 shows a perspective sectional view of a second embodiment of an apparatus according to the invention.

As can be seen in FIG. 6, the fourth toothed belt wheel 4 is connected to a hollow body 55, which has an inner toothing 55a. Furthermore there exists inside the hollow body 55 and in connection with the inner toothing 55a a planetary gearing 50 with planetary wheels 51 and sun wheel 52. With the sun wheel 52 standing still, the planetary wheels 51 circle around the sun wheel 52 in the same rotational direction as the fourth toothed belt wheel 4 owing to the turning of the fourth toothed belt wheel 4 and of the hollow body 55 with its inner toothing 55a. The circling of the planetary wheels 51 drives a shaft 53, which is connected to the third toothed belt wheel 3. The number of teeth or respectively the diameter of the third toothed belt wheel 3 is selected in such a way that the first toothed belt wheel 1 and the second toothed belt wheel 2 turn synchronously with stationary sun wheel.

With the second motor 14, a fifth toothed belt wheel 54, which is connected to the sun wheel 52, can be driven via a second motor drive belt 14a. The turning of the fifth toothed belt wheel 54 by angle β thus brings about the turning of the sun wheel 52. A turning of the sun wheel 52 in the same direction as the fourth toothed belt wheel 4 brings about a quicker circling of the planetary wheels 51 and thus a quicker turning of the shaft 53 and of the third toothed belt wheel 3. Since the third toothed belt wheel 3 drives the first toothed belt wheel 1, a turning of the toothed belt wheels 1, 2 and an adjusting ring-twist-angle ψ is consequently achieved with a turning of the sun wheel 52 by angle β. As in the previous preferred embodiments, the above-described mechanism brings about the phase shift ψ and the adjustment of the position of the blades 23. It is important to note that the adjusting ring-twist-angle ψ is also here independent of the rotational speed of the toothed belt wheels 1, 2 and that the toothed belt wheels 1 and 2 again turn synchronously as soon as the second motor and the sun wheel stand still, and thereby a new cutting diameter Df is set. Hence the setting of the adjusting ring-twist-angle ψ only represents a phase shift with respect to the adjustment position.

Once again the exact mathematical relationship between the angle of rotation β of the sun wheel 52 and the cutting diameter Df will not be derived here. One skilled in the art could derive this correlation without any difficulty through trigonometric considerations. It is only pointed out here that it is also possible here to derive the correlation between β and Df. Instead of driving the sun wheel 52 via the fifth toothed belt wheel 54, it could also be driven directly via a geared motor.

One skilled in the art will easily understand that the blades 23 of the apparatuses 100, 200 and 300 could easily be replaced by centering jaws. The centering jaws then would make possible the centering or holding of the cable in the direction of the rotational axis of the first and second toothed belt wheels 1, 2.

It is also to be noted that although in the embodiments presented here the distance of the blades 23 in relation to rotational axis X is set by means of a pivot mechanism, one skilled in the art could of course use other known closing or respectively opening mechanisms within the scope of the present invention. In particular one skilled in the art would recognize that a spiral flange could easily be used for this. A spiral flange would in particular facilitate the blades 23 being able to be displaced radially in relation to the rotational axis X.

Here it is to be noted that the invention is not limited to the described embodiments. It will be clear to one skilled in the art that further developments and modifications are absolutely possible within the scope of the protected invention. Device elements can be exchanged for other elements that fulfil the same or similar functions, as required. Additional devices and elements could likewise be provided. These and other measures and elements fall within the scope of the invention, which is defined by the claims.

LIST OF REFERENCE NUMERALS

1. First toothed belt wheel
2. Second toothed belt wheel
3. Third toothed belt wheel
4. Fourth toothed belt wheel
5. Deflection roller
6. Tensioning roller
7. Spindle
8. First carriage
9. Second carriage
10. Drive shaft
11. First toothed belt
12. Second toothed belt
13. Drive means, first motor
13a. First motor drive belt
14. Second motor
14a. Second motor drive belt
15. Spring
16. Bearing sleeve
17. Adjusting ring
18. Setting means, positioning pins
19. Rotor
20. Pivot pins
21. Tool flange
22. Spring bolts
23. Tools
25. Exhaust pipe
30. Deflection belt
31a. First movable deflection roller
31b. Second movable deflection roller, movable tensioning roller 31c. First non-movable deflection roller
31d. Second non-movable deflection roller
32. Carriage
33. Spindle
34. Track
50. Planetary gearing
51. Planetary wheels
52. Sun wheel
53. Shaft
54. Fifth toothed belt wheel
55. Hollow body
55a. Inner toothing of the hollow body, annulus gear
100. Apparatus according to first embodiment
200. Apparatus according to second embodiment
300. Apparatus according to third embodiment
λ Knife-pivot-angle
η Adjusting ring-adjustment-angle
ψ. Adjusting ring-twist-angle
φ. Adjusting ring-total-angle

The invention claimed is:

1. An apparatus for cutting, centering or holding a cable in a stripping head, comprising:
a first toothed belt wheel and a second toothed belt wheel, which are rotatable coaxially and synchronously, but however in an angularly adjustable way with respect to one another, and
a tool flange coaxially connected to the first toothed belt wheel, in which tool flange a central opening is disposed, through which a cable is able to be led or passed, the tool flange comprising one or more movably attached tools, wherein the tools are movable in relation to a rotational axis (X) by means of positioning means connected to the second toothed belt wheel,
wherein a radial distance of the tools to the rotational axis (X) is adjustable through an angular rotation between the first toothed belt wheel and the second toothed belt wheel, which are driven by a common drive means.

2. The apparatus according to claim 1, comprising a third toothed belt wheel and a fourth toothed belt wheel, which are drivable by means of the drive means, wherein the first toothed belt wheel is drivable by the third toothed belt wheel via a first toothed belt and the second toothed wheel is drivable by the fourth toothed belt wheel via a second toothed belt.

3. The apparatus according to claim 2, comprising at least one deflection roller and one tensioning roller, which deflect the second toothed belt, wherein the angular rotation between the first toothed belt wheel and the second toothed belt wheel is achievable through a position change of the deflection roller and/or the tensioning roller.

4. The apparatus according to claim 3, wherein the third toothed belt wheel and the fourth toothed belt wheel are united.

5. The apparatus according to claim 3, comprising a second motor, with which the position change of the deflection roller is drivable, wherein the angular rotation between the first toothed belt wheel and the second toothed belt wheel is achievable.

6. The apparatus according to claim 2, comprising a deflection belt kept under tension, which connects the third toothed belt wheel and the fourth toothed belt wheel, as well as a first movable deflection roller, which is disposed along the deflection belt between the third toothed belt wheel and the fourth toothed belt wheel and deflects the deflection belt, wherein the angular rotation between the first toothed belt wheel and the second toothed belt wheel is achievable through a position change of the first movable deflection roller.

7. The apparatus according to claim 6, wherein a center of the first movable deflection roller is always disposed on a perpendicular bisector between a center of the third toothed belt wheel and a center of the fourth toothed belt wheel, and wherein a diameter of the first movable deflection roller corresponds to a peripheral distance between the third toothed belt wheel and the fourth toothed belt wheel.

8. The apparatus according to claim 6, comprising at least one first non-movable deflection roller and one second non-movable deflection roller, as well as a second movable deflection roller or tensioning roller, which is installed with the first movable deflection roller on a carriage, wherein the second movable deflection or tensioning roller is disposed along the deflection belt between the first non-movable deflection roller and the second non-movable deflection roller and deflects the deflection belt, wherein the angular rotation between the first toothed belt wheel and the second toothed belt wheel is achievable through a translational movement of the carriage.

9. The apparatus according to claim 2, comprising a planetary gearing with annulus gear, planetary wheels and sun wheel, wherein circling of the planetary wheels about the sun wheel is drivable through rotation of the fourth toothed belt wheel, wherein through the circling of the planetary wheels about the sun wheel a shaft is drivable, which is connected to the third toothed belt wheel, wherein the sun wheel is installed in a way rotatable about a common rotational axis of the third toothed belt wheel and of the fourth toothed belt wheel and wherein the angular rotation between the first toothed belt wheel and the second toothed belt wheel is achievable through a rotation of the sun wheel.

10. The apparatus according to claim 9, comprising a second motor, with which the rotation of the sun wheel is drivable, through which the angular rotation between the first toothed belt wheel and the second toothed belt wheel is achievable.

11. The apparatus according to claim 1, comprising a third toothed belt wheel and a fifth toothed belt wheel, which are drivable by means of the drive means, the first toothed belt wheel being drivable by the third toothed belt wheel via a first toothed belt and the second toothed belt wheel being drivable by the fifth toothed belt wheel via a second toothed belt, as well as a planetary gearing with planetary wheels, and a sun wheel connected and drivable with the fifth toothed belt wheel, wherein the planetary gearing is disposed inside a hollow body with inner toothing, wherein through circling of the planetary wheels around the sun wheel a shaft is drivable which is connected to the planetary wheels and to the third toothed belt wheel, and wherein the angular rotation between the first toothed belt wheel and the second toothed belt wheel is achievable through a rotation of the hollow body.

12. The apparatus according to claim 1, wherein the tools are disposed evenly on the tool flange.

13. The apparatus according to claim 1, wherein the tools are installed on the tool flange in a way swivel mounted about pivot pins.

14. The apparatus according to claim 1, wherein the tools are installed on the tool flange in a radially displaceable way.

15. The apparatus according to claim 1, wherein the angular rotation between the first toothed belt wheel and the second toothed belt wheel is controllable with electronic means.

16. The apparatus according to claim 1, wherein the tools are blades.

17. The apparatus according to claim 16, comprising detection means, with which a contact between said blades and an electrical conductor of the cable to be stripped is detectable.

18. The apparatus according to claim 1, wherein the tools are centering jaws.

19. The apparatus according to claim 1, said tools being adapted to change, a shape of insulating sheathing of a cable.

20. A cable-stripping device comprising the apparatus according to claim 1.

* * * * *